United States Patent

[11] 3,614,531

[72] Inventor Joseph V. Oswald
 2852 South Central Park Ave., Chicago, Ill.
 60623
[21] Appl. No. 64,731
[22] Filed Aug. 18, 1970
[45] Patented Oct. 19, 1971
 Continuation-in-part of application Ser. No.
 715,893, Mar. 25, 1968, now abandoned.

[54] SHUNT MEANS FOR PROTECTING A POWER SUPPLY AGAINST BACK EMF
 7 Claims, 3 Drawing Figs.
[52] U.S. Cl. .................................................. 317/16,
 317/43, 317/DIG. 6, 317/33 SC
[51] Int. Cl. .................................................. H02h 7/10
[50] Field of Search .................................. 307/104,
 127, 102, 100; 317/33 SC, 43, DIG. 6, 16, 39;
 321/11

[56] References Cited
UNITED STATES PATENTS
3,213,349 10/1965 Gutzwiller .................... 317/43 X Primary Examiner—J. D. Miller
Assistant Examiner—Harvey Fendelman
Attorney—Kinzer, Dorn and Zickert ABSTRACT: A protective circuit for protecting a rectifier system or other direct current power supply from an excessive inverse-polarity voltage, comprising a diode or other unidirectionally conductive control device connected in series with the power supply and a load, a sensing resistance connected across the diode, a signal-controlled semiconductor gate device such as an SCR connected across the load, and a shunt resistance connected across the power supply. The gate device is driven conductive by a control signal from the sensing resistor whenever an inverse-polarity voltage occurs, preventing the voltage from reaching the power supply. In the preferred construction, a blocking diode is connected in series with the sensing resistor.

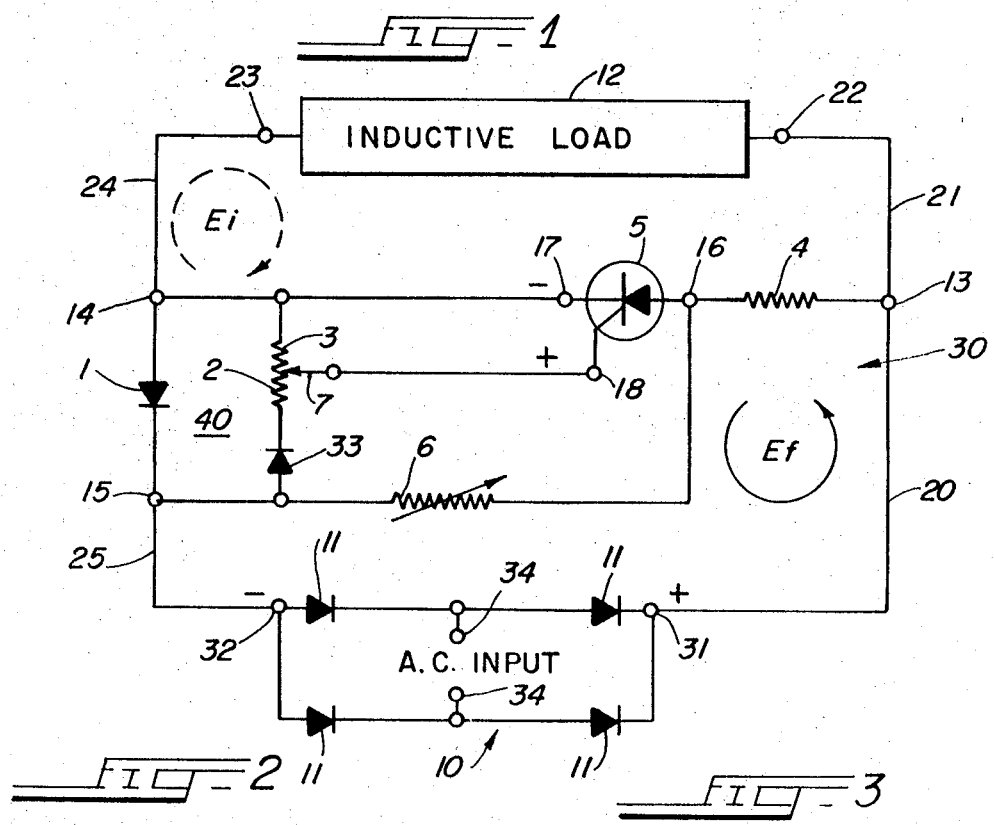
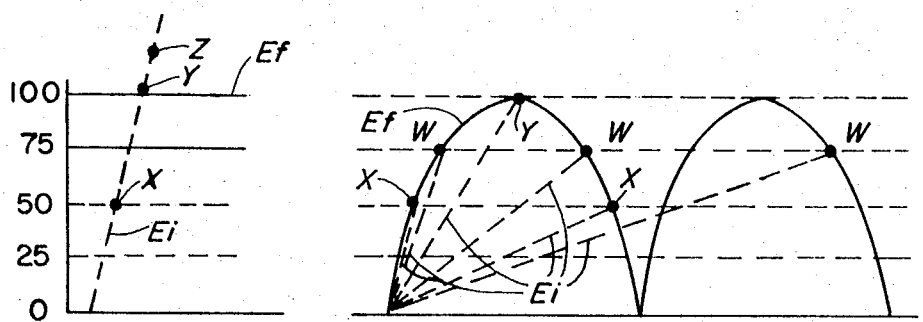

SHUNT MEANS FOR PROTECTING A POWER SUPPLY AGAINST BACK EMF

CROSS-REFERENCE TO RELATED APPLICATION

This application is a continuation-in-part of Ser. No. 715,893 filed Mar. 25, 1968, now abandoned.

BACKGROUND OF THE INVENTION

An inductive load energized from a rectifier system or other DC power supply may be subject to external magnetic influences of sufficient magnitude to induce substantial forward or inverse voltages in the load by transformer action. The inverse voltages, as applied to the power supply, may be of sufficient amplitude to exceed the inverse-voltage characteristics of the rectifier elements or other components of the power supply. When this occurs, substantial damage to the power supply may result.

Typical inductive loads, in circuits of the kind under consideration, include the DC energized field windings of some kinds of rotating electrical equipment, both motors and generators. In the course of operation of such equipment, abrupt and wide-ranging changes in the flux content of the direct current field members may be caused by the imposition of severe shock loads, in the case of a motor, or by abrupt current overloads or short circuits in the case of a generator. Disturbances of this kind are frequently accompanied by the tripping of overload protective devices.

The effect of these disturbances is reflected into the field windings through simultaneous and similarly abrupt and wide-ranging changes in the demagnetizing influence of the armature reaction, which is an inherent characteristic of most such electrical rotating equipment. In the case of a conventional synchronous motor, the transformer action between the AC energized stator windings and the DC field windings during starting and synchronizing intervals, the transient effects of "hunting" caused by periodic load surges, and "pole slipping" due to intermittent momentary excessive overloads may be taken as a comprehensive illustration of the kind of magnetic interaction that produces substantial voltage surges in the DC circuit.

The absorption and dissipation of forward-acting voltage and current transients generated in inductive loads energized from DC power supplies pose only minor problems, in most instances. These transients can be absorbed through the power supply or, if the current to the load is subject to interruption, they may be absorbed by unidirectionally biased low-impedance discharge paths. But the absorption and dissipation of voltage transients and currents of opposite polarity, originating in an inductive load energized from a rectifier or other DC power supply, pose substantially greater problems. The rectifier networks usually used as DC power supplies cannot tolerate appreciable inverse current flow and hence do not serve as a suitable discharge path for currents caused by inverse voltage transients.

Various kinds of nonlinear resistors, such as Thyrite and selenium resistors, have been used in protective circuits intended to alleviate the problem of inverse voltage transients. However, these expedients may leave a wide differential of inverse voltage over peak supply voltage for the rectifier or other power supply to cope with.

Somewhat better results have been achieved through protective circuits that utilize semiconductor devices of the avalanche breakdown or "zener" type. These devices effectively maintain a virtually open circuit with respect to current derived from a voltage below an inherent critical point but become substantially conductive when that critical voltage is reached. In protective circuits of this kind, the zener device itself may serve to absorb low-energy-level transient voltages and currents of short duration. On the other hand, zener diodes and like devices have been incorporated into circuits that actuate controlled switching devices of comparatively high capacity that provide discharge paths for absorbing and dissipating high-energy-level transients of long duration through suitably dimensioned resistances.

Most of these protective circuits, however, are necessarily tailored to respond to certain fixed voltages. In some cases, the devices are particularly constructed for protection against specific kinds of transients. Other protective circuits involve capacitances and inductances which may introduce frequency characteristics that can interfere with proper operation in response to some kinds of transients. Moreover, the response voltages of most of these circuits are substantially in excess of the peak value of the supply source voltage. In some instances, the response voltage exceeds the power supply voltage by more than 100 percent. Thus, the response characteristics of these protective circuits may be inadequate in many applications.

SUMMARY OF THE INVENTION

Accordingly, it is a principal object of the present invention to provide a new and improved protective circuit for protecting a unidirectional power supply from inverse polarity voltages, which may originate in a load connected to the power supply, which circuit effectively and inherently minimizes the problems and difficulties of previously known protective circuits as discussed above.

A further object of the invention is to provide a new and improved protective device for protecting a DC power supply from reverse polarity transients that is responsive to a minimum differential of reverse polarity voltage over the peak value of the supply voltage.

A specific object of the invention is to provide a new and improved protective device for protecting a DC power supply from inverse polarity voltages that is inherently flexible and versatile to the extent that the level of response to an inverse voltage surge may be readily adjusted to a value greater or smaller than the peak value of the supply voltage. When adjusted to a value less than the supply source voltage, the protective circuit may not be responsive to the differential of the supply voltage over the relatively lower circuit response voltage under conditions of steady state energization of the load.

Another important object of the invention is to provide a new and improved protective circuit for protecting a unidirectional power supply from inverse polarity surges, which circuit is responsive to an instantaneous excess of inverse voltage over supply voltage rather than to a fixed inverse voltage amplitude.

Accordingly, the invention relates to a protective circuit for protecting a unidirectional power supply from inverse polarity voltages originating in a load connected to the power supply. The protective circuit comprises a signal-controlled gate device having an anode-cathode discharge path connected in parallel with the load and actuatable from a normal open-circuit condition to a conductive condition in response to an applied signal. The circuit further comprises sensing means, connected in series with the load, for developing a control signal in response to an inverse polarity voltage in the load circuit that exceeds the instantaneous forward voltage from the power supply. This sensing means comprises a unidirectionally conductive control device connected in series with the power supply and the load, and a sensing impedance connected in parallel with the control device. Means are provided for applying the control signal to the aforesaid gate device to actuate the gate device to its conductive condition in response to the control signal and thus prevent application of an inverse polarity current to the power supply.

BRIEF DESCRIPTION OF THE DRAWINGS

FIG. 1 is a schematic diagram of a protective device constructed in accordance with one embodiment of the invention; and FIGS. 2 and 3 are graphs illustrating the operation of the circuit of FIG. 1.

DESCRIPTION OF THE PREFERRED EMBODIMENT

FIG. 1 illustrates a protective circuit 30, constructed in accordance with one embodiment of the present invention, that is employed to protect a power supply 10 from inverse polarity surges that may be developed in a load 12 connected to the power supply. The power supply 10 is a conventional diode bridge comprising four diodes 11 connected to each other in a full-wave rectifier circuit. The input to the power supply 10 comprises two terminals 34 that are connected to an appropriate AC supply. The output terminals of the power supply 10 are the positive terminal 31 and the negative terminal 32. The positive terminal 31 of the power supply is connected to one input terminal 22 of the inductive load 12 by the series conductors 20 and 21. The negative power supply terminal 32 is connected to a second input terminal 23 for the load 12 by two series conductors 24 and 25. The inductive load 12 may comprise the field windings of a motor or generator, particularly a synchronous AC machine.

The protective circuit 30, in the embodiment illustrated in FIG. 1, comprises a signal-controlled semiconductor gate device 5 having an anode 16, a cathode 17, and a gate electrode 18. The anode 16 is connected to the load terminal 22 through a resistor 4 and conductor 21, whereas the cathode 17 is connected to the load terminal 23 through conductor 24. The gate device 5 is actuatable from a normal nonconductive condition to a conductive condition in response to a signal applied to the gate electrode 18. It will be recognized that the gate device 5, as shown in FIG. 1, is a conventional signal-controlled rectifier, usually referred to as an SCR. However, other signal-controlled gate devices can be utilized if desired.

The protective device 30 further comprises a sensing means 40 that is connected in series with the load 12 and that is employed to develop a control signal in response to a reverse-polarity voltage in the load circuit that exceeds the instantaneous forward-polarity voltage from the power supply 10. The sensing means 40 includes a unidirectionally conductive control device 1, shown as a diode, that is connected in series with the power supply 10 and the load 12 between the terminals 14 and 15. The sensing means 40 further includes a sensing impedance 2, shown as a potentiometer, that is connected in parallel with the unidirectionally conductive control device 1.

Preferably, a blocking diode 33 is connected in series with the sensing resistance 2; the blocking diode 33 is reverse polarized as compared with the control diode 1. The tap 7 on the sensing potentiometer 2 is electrically connected to the control electrode 18 of the SCR 5. This affords a means for applying a control signal, developed across the upper portion 3 of the sensing impedance 2, to the control electrode 18 of the SCR 5. A fixed resistor can be substituted for the potentiometer 2 if desired. A shunt resistance 6 is connected from the load circuit junction 15 to the resistor 4 in the anode circuit of the gate device 5, affording a complete circuit through the resistors 4 and 6 between the load circuit terminals 13 and 15. The resistor 6 is shown as an adjustable resistance, but a fixed resistor may be employed.

STEADY STATE VOLTAGES AND CURRENTS

In steady state operation, the DC voltage supply 10 is energized from an AC source connected to the input terminals 34. Load current flows from the positive terminal 31 of the power supply 10 through the conductors 20 and 21 to the load terminal 22. The load current continues through the load 12 and its terminal 23 and then through the conductor 24, the control diode 1, and the conductor 25 back to the negative terminal 32 of the power supply 10. In some modifications of the protective circuit 30, the blocking diode 33 may be omitted; under these circumstances, a negligible part of the load current, between terminals 14 and 15, may flow through the resistor 2.

The forward current through the control diode 1 produces a fractional voltage drop between the junctions 14 and 15, with a negative polarity at junction 15. Accordingly, tap 7 on the sensing impedance 2 is slightly negative relative to the junction 14, and the gate electrode 18 of the gate device 5 is negatively biased with respect to its cathode. This increases the breakover voltage of the gate device 5 to a limited extent.

Under steady state conditions, there is a secondary current that does not flow through the inductive load 12. This secondary current, beginning at the positive power supply terminal 31, flows through the conductor 20 to the terminal 13 and thence through the resistors 4 and 6 to the terminal 15 and back through the conductor 25 to the negative power supply terminal 32. Under steady state conditions, the current through the resistors 4 and 6 originates solely in the power supply 10; this secondary current cannot flow through the resistor 2 because the gate device, SCR 5, is effectively open-circuited. Thus, there is no appreciable flow of current through the sensing impedance 2 and the gate control circuit, the sensing circuit 40, does not actuate the gate device 5 to conduction, regardless of fluctuations in the current to the load or through the resistors 4 and 6.

INVERSE TRANSIENT VOLTAGE AND CURRENT

In considering the effect of an inverse transient upon the operation of the protective circuit 30, it may be initially assumed that there is an appreciable induced voltage of reverse polarity, relative to the normal operation of the circuit, in the inductive load 12, and a total absence of output voltage from the power supply circuit 10. Under these conditions, the inverse voltage causes a current to flow from the load terminal 22 through conductor 21 to junction 13 and then through the series-connected resistances 4 and 6 to the junction 15 at the cathode of the unidirectionally conductive control device, diode 1. The reverse resistance of the diodes 11 in the power supply 10 prevents the flow of appreciable reverse current through the power supply. The current flowing through the resistors 4 and 6, since it originates in the load device 12, must return to the load terminal 23.

Due to the high reverse resistance of the control diode 1, the current now flows through the blocking diode 33 and through the sensing impedance 2 to the junction 14 and then through the conductor 24 to the load terminal 23. A part of this inverse current is diverted, at the tap 7 on the potentiometer 2, into the gate terminal 18 of the gate device 5. At the potentiometer tap 7, the current is divided according to the relative resistances of the upper portion 3 of the potentiometer 2 and the parallel path that extends through the gate electrode and through the cathode of the signal-controlled rectifier 5. Because the current flow is necessarily in the direction from junction 15 to junction 14, the tap 7 on the sensing potentiometer 2 is driven positive with respect to the junction 14. With this polarity, the signal-controlled gate device 5 may be driven to conduction, contingent upon the presence of sufficient voltage across the upper portion 3 of the sensing potentiometer 2, between the tap 7 and the junction 14.

During intervals in which there is an inverse polarity voltage that exceeds the normal operating voltage from the power supply 10, therefore, the resistances 4, 6, and 2 afford a voltage divider circuit between the junctions 13 and 14; from that divider circuit, the required control signal to switch the semiconductor device 5 into conduction is derived at the tap 7 on the sensing impedance 2. The discharge resistance 4 may be omitted entirely; when present, it may be of such low impedance as to have negligible effect on the voltage distribution in the voltage divider circuit and thus can be disregarded in further consideration of the operational effect of the voltage divider. Thus, for any given combination of values for the resistances 2 and 6 there is an inverse voltage between junctions 13 and 14 which provides the required gate current to switch the gate device 5 into conduction, which inverse voltage is the specific voltage of response of the protective circuit 30.

OVERALL CIRCUIT OPERATION

Solely for purposes of simplification, it may be assumed that the load 12 is under steady state energization from the power supply 10, at a constant voltage, and that the resistances 2 and 6 have been selected or set to trigger the gate device 5 to conduction at an inverse voltage equal to the amplitude of the voltage from the power supply 10. This condition is generally illustrated in FIG. 2, in which the steady state voltage E*f* is taken as the reference level 100.

An inverse voltage E*i* may be induced in the load device 12, with an amplitude potentially in excess of the 100 level of the forward voltage E*f*. Until the transient or surge voltage E*i* reaches the amplitude of the forward voltage E*f*, the current through the resistance 6 is derived from the preponderant forward voltage and flows from junction 13 to junction 15. This current must continue from junction 15 through the conductor 25 to the negative terminal 32 of the power source 10. Thus, there is no current of appreciable amplitude through the sensing resistance 2 and no control current to the gate terminal 18, so that the gate device 5 is not triggered into conduction.

As the amplitude of the inverse polarity voltage surge E*i* increases further, however, and exceeds the amplitude of the forward voltage E*f*, the current flow through the resistor 6 is diverted into the sensing resistor 2 at the junction 15. That is, with E*i*>E*f*, the current through the resistor 6 is in the direction from junction 13 through the resistor 6 and then from the junction 15 through the sensing resistor 2 to the junction 14. As soon as the amplitude of this current reaches a sufficient value, determined by the resistance of the upper portion 3 of the sensing impedance 2 and by the operating characteristics of the gate device 5, the gate device is triggered to conduction. Conduction may occur at approximately the point Y in FIG. 2. With the gate device 5 conductive, the inverse voltage surge is dissipated in the discharge resistance 4 and in the overall impedance of the load circuit 12.

When the inverse voltage surge has been dissipated, the signal-controlled gate device 5 reverts to its normal nonconductive state. In the illustrated circuit, this occurs when the anode 16 of the SCR 5 goes to zero voltage between pulses of the rectified output from the power supply 10. With gate device 5 nonconductive, the protective circuit returns to its steady state energization conditions, as described above.

In the operation of the protective circuit 30, as described immediately above, the response voltage for the protective circuit was considered to be set to a level substantially equal to the peak value of the voltage supply 10. Under these circumstances, the protective circuit reacts to a minimum differential of the inverse voltage E*i* over the forward voltage E*f*. This differential may be increased, however, by increasing the value of the resistance 6 or by decreasing the resistance of the upper portion 3 of the sensing impedance 2 by adjustment of the tap 7. In this manner, the circuit can be adjusted so that the inverse voltage E*i* must rise to a substantially greater level Z before the protective circuit 30 functions to bypass the inverse voltage from the power supply 10.

Conversely, the resistances 2 and 6 may be proportioned to fix the response voltage of the protective circuit 30 at the 50 level, FIG. 2, equal to one-half the peak supply voltage E*f*. Under these circumstances, when the inverse voltage E*i* rises to the point X, it would be sufficient to provide an effective triggering current for the gate device 5, but this does not occur because of the higher value of the forward voltage E*f*. That is, the circuit does not produce a substantial triggering current until the inverse voltage E*i* exceeds the forward voltage E*f*.

These conditions and values have been projected into FIG. 3, in which the forward voltage E*f* is illustrated as the normal waveform from a rectifier power supply such as the power supply 10. It will be seen that the controlled rectifier constituting the gate device 5 may be triggered into conduction at any of the various points W, X, and Y at which the inverse voltage E*i* may reach, intersect, and emerge appreciably above the instantaneous value of the forward voltage E*f*. That is, the response voltage of the protective circuit 30 may be set at virtually a minimum value. When this is done, the circuit will respond to a minimum differential of inverse voltage E*i* over forward (supply) voltage E*f* at any point on the voltage wave and yet will not be responsive to any value of forward voltage so long as the forward voltage does not exceed the breakover voltage characteristic of the gate device 5.

In order to afford a more specific example of the invention, circuit data for one specific protective circuit are set forth below. It should be understood that this information is presented solely by way of illustration and in no sense as a limitation on the invention.

| | |
|---|---|
| Gate device 5 | 2N687 |
| Resistor 6 | 5 kilohms |
| Total sensing resistance 2 | 39 kilohms |
| Resistance 3 | 1 kilohm |
| AC supply voltage | 135 volts RMS |
| E*f* peak | 188 volts |
| E*i* response level | 188 volts |

The particular diodes used for devices 1, 11, and 33 are not especially critical. The resistor 4 can be any relatively small value compared to resistor 6.

The single embodiment described herein was chosen for its simplicity, to afford as much clarity to the specification and description as practicable. It will be obvious that it is highly susceptible to modification through addition of already-known circuitry and components to render it adaptable to applications other than the single-phase rectifier and inductive load combination here employed. Accordingly, any modification resulting in the achievement of the demonstrated objects and advantages of the present invention may be deemed to reside within the spirit of the present invention and the scope of the appended claims.

I claim:

1. A protective circuit for protecting a unidirectional power supply from inverse-polarity voltages originating in a load connected to the power supply, said circuit comprising:
   a discharge circuit, connected across the input terminals of the load, said discharge circuit including, in series, a signal-controlled gate device actuatable from a normal nonconductive condition to a conductive condition in response to an applied signal;
   sensing means, connected in circuit with the load, for developing a control signal in response to an inverse-polarity voltage in the load circuit that exceeds the instantaneous forward-polarity voltage from the power supply;
   said sensing means comprising a first unidirectionally conductive device connected in series with the power supply and the load and a sensing impedance connected in parallel with said unidirectionally conductive device;
   a shunt impedance connected across said power supply; and
   means for applying the control signal to the gate device in the discharge circuit to actuate the gate device to its conductive condition and thereby prevent application of an inverse-polarity current to the power supply.

2. A protective circuit for a unidirectional power supply, according to claim 1, and further comprising an additional unidirectionally conductive device, connected in series with said sensing impedance, with a polarity to preclude current flow through said sensing impedance in the direction of current flow through said first unidirectionally conductive device.

3. A protective circuit for a unidirectional power supply, according to claim 1, in which said shunt impedance comprises a discharge resistance and another resistance connected in series with each other from the positive power supply terminal to the negative power supply terminal, and in which said gate device is a signal-controlled semiconductor device having an anode connected to the common junction of said two resistances, a cathode connected to one terminal of said sensing impedance, and a gate electrode connected to another terminal on said sensing impedance.

4. In combination with a load connected to a rectifier system serving as a direct current power supply, circuit means nonresponsive to a first voltage corresponding to the output voltage of the power supply, but, responsive to a second voltage corresponding substantially to an inverse polarity voltage which may be induced in the load, said second voltage having an amplitude greater than said first voltage and smaller than the inverse voltage characteristic of said power supply, said circuit means comprising, in combination:

a unidirectionally conductive device connected in the load circuit and having an anode connected to a first terminal of the load and a cathode connected to the negative terminal of the power supply;

a sensing resistance having its terminals connected to the anode and cathode, respectively, of said unidirectionally conductive device;

a signal-controlled semiconductor gate device having an anode connected to a juncture of the positive terminal of the power supply and a second terminal of the connected load, having a cathode connected to the anode of said unidirectionally conductive device, and having a gate electrode connected to said sensing resistance; and shunt resistance means having one terminal connected to the anode of said gate device and having a second terminal connected to the cathode of said unidirectionally conductive device.

5. In a circuit constructed in accordance with claim 4, a discharge resistance connected in series between the anode of the gate device and the positive terminal of the power supply.

6. A voltage-responsive circuit for protecting a rectifier system from harmful inverse polarity voltages emanating from a load connected to the rectifier system, said circuit comprising:

a normally open discharge path connected across the input terminals of said load, said discharge path including a signal-controlled solid-state switching device and operable to close said discharge path upon application of a predetermined signal current to a gate terminal of the said controlled switching device from an inverse voltage related source of gate current comprising a polarity-responsive sensing circuit including a diode serially connected in forward bias relation between the load and the rectifier system, a sensing resistance connected in shunt relation to said diode, and a shunt resistance connected in shunt relation to the output terminals of said rectifier system and dimensioned and arranged to cooperate with said diode and said sensing resistance to provide a predetermined gate signal voltage across said sensing resistance to cause said switching device to conduct contingent upon occurrence of an excess of inverse voltage over the instantaneous value of forward voltage.

7. A voltage-responsive protective circuit as defined in claim 6 and further comprising a current-limiting device serially connected into said discharge path.